(12) United States Patent
Regev

(10) Patent No.: US 6,308,891 B1
(45) Date of Patent: Oct. 30, 2001

(54) JEWELRY IDENTIFICATION

(75) Inventor: Eyal Regev, Kfar Shmaryahu (IL)

(73) Assignee: T.I.D. (The Identifying Diamond) Inc., New York, NY (US)

( * ) Notice: Subject to any disclaimer, the term of this patent is extended or adjusted under 35 U.S.C. 154(b) by 0 days.

(21) Appl. No.: 09/304,853

(22) Filed: May 5, 1999

(51) Int. Cl.[7] .............................. G06K 7/10; G06K 19/06
(52) U.S. Cl. ................................ 235/462.03; 235/462.13; 235/487
(58) Field of Search ............... 235/375, 462.01–462.03, 235/462.13, 487, 491, 492, 493, 900; 219/121.68; 125/30.01

(56) References Cited

U.S. PATENT DOCUMENTS

| | | | |
|---|---|---|---|
| 1,383,104 | * 6/1921 | Grossman | 63/1.14 |
| 1,700,497 | 1/1929 | Heitzler | 356/30 |
| 1,799,604 | 4/1931 | Read | 356/30 |
| 3,740,142 | 6/1973 | Takubo | 356/30 |
| 3,947,120 | 3/1976 | Bar-Issac et al. | 356/30 |
| 4,012,141 | 3/1977 | Hanneman | 356/30 |
| 4,125,770 | 11/1978 | Lang | 378/74 |
| 4,200,506 | 4/1980 | Dreschhoff et al. | 423/446 |
| 4,316,385 | 2/1982 | DeVries et al. | 73/104 |
| 4,354,189 | * 10/1982 | Lemelson | 340/825.31 |
| 4,392,476 | * 7/1983 | Gresser et al. | 125/30.01 |
| 4,467,172 | 8/1984 | Ehrenwald et al. | 219/121.68 |
| 4,707,592 | * 11/1987 | Ware | 235/379 |
| 4,749,847 | * 6/1988 | Despres | 235/487 |
| 4,799,786 | 1/1989 | Gerrard | 356/30 |
| 4,900,147 | 2/1990 | Bowley et al. | 356/30 |
| 4,931,629 | 6/1990 | Frankfurt | 235/488 |
| 5,118,181 | 6/1992 | Yifrach et al. | 356/30 |
| 5,124,935 | 6/1992 | Wallner et al. | 347/225 |
| 5,379,102 | 1/1995 | Takeuchi | 356/30 |
| 5,401,561 | * 3/1995 | Fisun et al. | 235/487 X |
| 5,410,125 | 4/1995 | Winston et al. | 219/121.69 |
| 5,485,312 | 1/1996 | Horner et al. | 359/561 |
| 5,677,521 | * 10/1997 | Garrou | 235/375 |
| 5,828,405 | 10/1998 | Vanier et al. | 348/61 |
| 5,932,119 | * 8/1999 | Kaplan et al. | 219/121.68 |
| 6,045,671 | * 4/2000 | Wu et al. | 204/298.11 |
| 6,211,484 | * 4/2001 | Kaplan et al. | 219/121.68 |

FOREIGN PATENT DOCUMENTS

| | | |
|---|---|---|
| 1-305495 | * 12/1989 | (JP) . |
| 97/09687 | 3/1997 | (WO) . |

* cited by examiner

Primary Examiner—Michael G. Lee
Assistant Examiner—Jared J. Fureman
(74) Attorney, Agent, or Firm—Roylance,Abrams,Berdo & Goodman, L.L.P.

(57) ABSTRACT

A jewelry piece including a jewelry substrate having a recess formed therein, and an identification device, having detectable identification data formed thereon, disposed in the recess.

9 Claims, 1 Drawing Sheet

JEWELRY IDENTIFICATION

FIELD OF THE INVENTION

The present invention relates generally to apparatus for identification of jewelry, and particularly to a piece of jewelry with an identification device disposed therein.

BACKGROUND OF THE INVENTION

A large amount of jewelry is manufactured and sold around the world every year. As is well known, there is unfortunately a large amount of jewelry theft as well. Thus the importance of jewelry identification is clearly understood. By being able to identify a piece of jewelry, it may be possible to return lost or stolen jewelry to the rightful owner. In addition, many large jewelry stores offer repair services at little or no cost to purchasers of jewelry. Unfortunately, unscrupulous persons often try to cheat the store by bringing jewelry for repair which was not purchased at the store and which does not have a repair guarantee. Again, the ability to identify jewelry can prevent such costly cheating.

Apparatus and methods for identification of jewelry are well known. For example, U.S. Pat. No. 5,379,102 to Takeuchi, describes a system for identifying jewels including an automatic microscope, automatic image-analyzing apparatus, electric-resistance measuring apparatus, weighing apparatus, spectroscopic-analysis apparatus, and electronic information processing apparatus. The microscope forms an enlarged image of an identification number marked on a jewel to be identified. The image-analyzing apparatus receives the image of the identification number from the microscope and analyzes it. Additional identification information data is measured and processed, including electrical resistance between two reference points on the jewel, specific gravity of the jewel, and spectrum of reflected light from the jewel. The identification mark may be photo-etched on the jewel.

Other US Patents which deal generally with jewel identification include U.S. Pat. No. 1,700,497 to Heitzler, U.S. Pat. No. 1,799,604 to Read, U.S. Pat. No. 3,740,142 to Takubo, U.S. Pat. No. 3,947,120 to Bar-Issac et al., U.S. Pat. No. 4,012,141 to Hanneman, U.S. Pat. No. 4,125,770 to Lang, U.S. Pat. No. 4,200,506 to Dreschhoff et al., U.S. Pat. No. 4,316,385 to DeVries et al., U.S. Pat. No. 4,467,172 to Ehrenwald et al., U.S. Pat. No. 4,799,786 to Gerrard, U.S. Pat. No. 4,900,147 to Bowley et al., U.S. Pat. No. 5,119,181 to Yifrach et al., U.S. Pat. No. 5,124,935 to Wallner et al., U.S. Pat. No. 5,410,125 to Winston et al., U.S. Pat. No. 5,485,312 to Horner et al., and U.S. Pat. No. 5,828,405 to Vanier et al.

SUMMARY OF THE INVENTION

The present invention seeks to provide novel methods and apparatus for identification of jewelry.

There is thus provided in accordance with a preferred embodiment of the present invention a jewelry piece including a jewelry substrate having a recess formed therein, and an identification device, having detectable identification data formed thereon, disposed in the recess.

In accordance with a preferred embodiment of the present invention the identification data are optically detectable.

Further in accordance with a preferred embodiment of the present invention the identification data include a bar code.

Still further in accordance with a preferred embodiment of the present invention the identification data include magnetically recorded data suitable for reading by a magnetic reading device.

In accordance with a preferred embodiment of the present invention the identification device includes an integrated circuit with electrical contacts that are connectable to an electronic readout device.

Further in accordance with a preferred embodiment of the present invention the identification device includes a bead with the identification data formed on an outside surface thereof.

Additionally in accordance with a preferred embodiment of the present invention a seal is provided that seals the identification device in the recess.

There is also provided in accordance with a preferred embodiment of the present invention a method for jewelry identification including providing an identification device, forming detectable identification data on the identification device, forming a recess in a jewelry piece, and placing the identification device in the recess.

In accordance with a preferred embodiment of the present invention the step of forming identification data includes recording data related to at least one of the following data: dimensions of the jewelry piece, weight of the jewelry piece, material of the jewelry piece, purchase location, purchase date, period of repair guarantee, name of a purchaser, address of a purchaser, name of a manufacturer of the jewelry piece, and address of a manufacturer of the jewelry piece.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
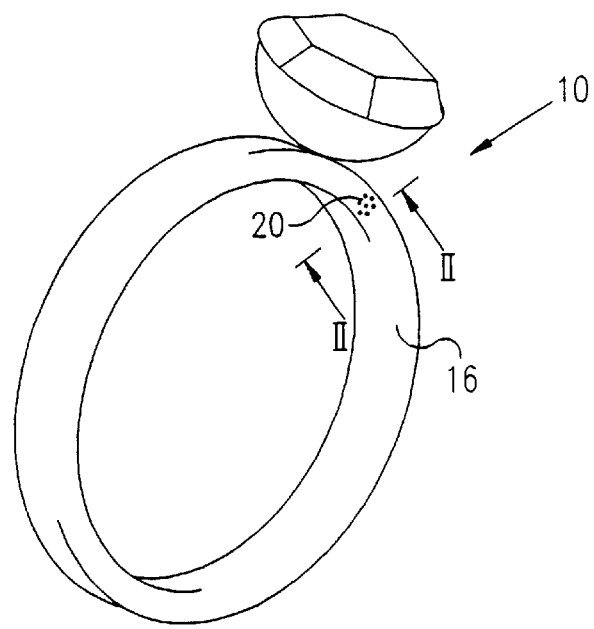
FIG. 1 is a simplified pictorial illustration of a jewelry piece constructed and operative in accordance with a preferred embodiment of the present invention.
Figure 2:
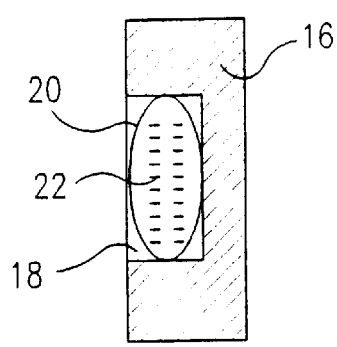
FIG. 2 is a simplified sectional illustration of the jewelry piece of FIG. 1, taken along lines II—II in FIG. 1, in accordance with a preferred embodiment of the present invention.

Reference is now made to FIGS. 1 and 2 which illustrate a jewelry piece 10 constructed and operative in accordance with a preferred embodiment of the present invention. Jewelry piece 10 is illustrated as a ring. This is, of course, just one example of a piece of jewelry, and it is readily appreciated by the skilled artisan that the present invention can be carried out for any kind of jewelry, jewel, gem or ornament.

Jewelry piece 10 includes a jewelry substrate 16, such as a portion of precious metal, for example, having a recess 18 formed therein (FIG. 2). An identification device 20, having detectable identification data 22 formed thereon, is disposed in recess 18. The identification data 22 may be in any suitable form, such as, but not limited to, optically detectable data (readable by suitable OCR equipment, for example), a bar code, or magnetically recorded data (suitable for reading by a magnetic reading device).

Identification device 20 may be a bead with the identification data 22 formed on an outside surface thereof. For example, identification device 20 may be a glass sphere with the identification data 22 photo-etched thereupon.

Identification device 20 is preferably fixedly placed in recess 18, either by tightly fitting into recess 18 or by means of bonding therein with an adhesive. In the illustrated embodiment of FIG. 2, recess 18 is generally open to the outside air. Such an embodiment is particularly useful for optically-readable identification data.

Figure 3:
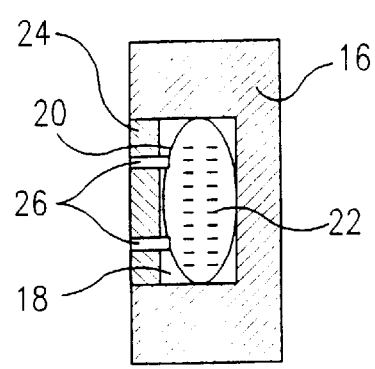
FIG. 3 is a simplified sectional illustration of the jewelry piece of FIG. 1, taken along lines II—II in FIG. 1, in accordance with another preferred embodiment of the present invention.

Alternatively, as shown in FIG. 3, a seal 24 may be provided which seals identification device 20 in recess 18. Seal 24 may be potting material, an opaque plug (metallic or non-metallic), or a transparent plug, for example.

As a further example, shown also in FIG. 3, identification device 20 may be an integrated circuit with electrical contacts 26 that are connectable to an electronic readout device, the contacts 26 generally passings through seal 24. Such an integrated circuit could be recorded with identification data 22 in the same manner as an IC of a smart card, for example.

The type of identification data 22 may include any pertinent data, such as, but not limited to, dimensions of jewelry piece 10, weight of jewelry piece 10, material of jewelry piece 10, purchase location, purchase date, period of repair guarantee, name of a purchaser, address of a purchaser, name of a manufacturer of jewelry piece 10, and address of a manufacturer of jewelry piece 10.

By providing jewelry piece 10 with identification device 20, the abovementioned problem of the prior art is solved, namely, jewelry piece 10 can be easily identified by readily available identification equipment (such as OCR devices, bar code readers, magnetic reading devices, or smart card readers, for example). Installing identification device 20 in jewelry piece 10 may be done quickly and inexpensively by the jewelry manufacturer or retailer.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A jewelry piece comprising:

a jewelry substrate having a recess formed therein; and an identification device, having detectable identification data formed thereon, disposed in said recess, and wherein said identification device comprises a transparent body other than a display jewel having said identification data etched therein, said identification device being embedded within said jewelry piece.

2. The jewelry piece according to claim 1 wherein said identification data are optically detectable.

3. The jewelry piece according to claim 1 wherein said identification data comprise a bar code.

4. The jewelry piece according to claim 1 wherein said identification data comprise magnetically recorded data suitable for reading by a magnetic reading device.

5. The jewelry piece according to claim 1 wherein said identification device comprises an integrated circuit with electrical contacts that are connectable to an electronic readout device.

6. The jewelry piece according to claim 1 wherein said identification device comprises a bead with said identification data formed on an outside surface thereof.

7. The jewelry piece according to claim 1 further comprising a seal which seals said identification device in said recess.

8. A method for jewelry identification comprising:

providing an identification device;

forming detectable identification data on said identification device;

forming a recess in a jewelry piece; and placing said identification in said recess, and wherein said identification device comprises a transparent body other than a display jewel;

said identification data is formed onto said identification device by being etched therein; and said identification device is embedded within said jewelry piece.

9. The method according to claim 8 wherein the step of forming identification data comprises recording data related to at least one of the following data: dimensions of the jewelry piece, weight of the jewelry piece, material of the jewelry piece, purchase location, purchase date, period of repair guarantee, name of a purchaser, address of a purchaser, name of a manufacturer of the jewelry piece, and address of a manufacturer of the jewelry piece.

* * * * *